US008091951B1

(12) United States Patent
Fitzgerald

(10) Patent No.: US 8,091,951 B1
(45) Date of Patent: Jan. 10, 2012

(54) CARGO VEHICLE WITH DRAG REDUCTION

(76) Inventor: James P. Fitzgerald, Murrieta, CA (US)

( * ) Notice: Subject to any disclaimer, the term of this patent is extended or adjusted under 35 U.S.C. 154(b) by 272 days.

(21) Appl. No.: 12/586,596

(22) Filed: Sep. 24, 2009

Related U.S. Application Data

(63) Continuation-in-part of application No. 12/080,654, filed on Apr. 4, 2008, now Pat. No. 7,625,034.

(51) Int. Cl.
B62D 37/02 (2006.01)
(52) U.S. Cl. .................................. 296/180.4; 296/180.1
(58) Field of Classification Search ............... 296/180.1, 296/180.2, 180.4
See application file for complete search history.

(56) References Cited

U.S. PATENT DOCUMENTS

| 3,425,740 | A | 2/1969 | Vaughn |
| 3,960,402 | A | 6/1976 | Keck |
| 3,999,797 | A | 12/1976 | Kirsch et al. |
| 4,021,069 | A | 5/1977 | Hersh |
| 4,320,920 | A | 3/1982 | Goudey |
| 4,818,015 | A | 4/1989 | Scanlon |
| 5,280,990 | A | 1/1994 | Rinard |
| 5,498,059 | A | 3/1996 | Switlik |
| 5,941,595 | A | 8/1999 | Schroeder et al. |
| 6,092,861 | A | 7/2000 | Whelan |
| 6,257,654 | B1 | 7/2001 | Boivin et al. |
| 6,286,894 | B1 | 9/2001 | Kingham |
| 6,309,010 | B1 | 10/2001 | Whitten |
| 6,467,833 | B1 | 10/2002 | Travers |
| 6,485,087 | B1 | 11/2002 | Roberge et al. |
| 6,634,700 | B1 | 10/2003 | Calvert |
| 6,666,498 | B1 | 12/2003 | Whitten |
| 6,685,256 | B1 | 2/2004 | Shermer |
| 6,742,616 | B2 | 6/2004 | Leban |
| 6,779,834 | B1 | 8/2004 | Keller |
| 6,799,791 | B2 | 10/2004 | Reiman et al. |
| 6,837,536 | B1 | 1/2005 | Schwartz |
| 6,854,788 | B1 | 2/2005 | Graham |
| 6,877,793 | B2 | 4/2005 | Cory |
| 6,959,958 | B2 | 11/2005 | Basford |
| 6,974,178 | B2 | 12/2005 | Ortega et al. |
| 6,986,544 | B2 | 1/2006 | Wood |
| 7,093,889 | B2 | 8/2006 | Graham |
| 7,152,908 | B2 | 12/2006 | Shahbazi |
| 7,165,804 | B2 | 1/2007 | Shahbazi |
| 7,185,944 | B2 | 3/2007 | Shahbazi |
| 7,192,077 | B1 | 3/2007 | Hilleman |
| 7,207,620 | B2 | 4/2007 | Cosgrove et al. |
| 7,240,958 | B2 | 7/2007 | Skopic |
| 7,243,980 | B2 | 7/2007 | Vala |
| 7,255,387 | B2 | 8/2007 | Wood |
| 2009/0179456 | A1* | 7/2009 | Holubar ................ 296/180.4 |

* cited by examiner

Primary Examiner — Lori Lyjak
(74) Attorney, Agent, or Firm — Loyal McKinley Hanson

(57) ABSTRACT

A semi-trailer or other cargo vehicle enclosure includes a rearward end portion extending between opposite left and right sidewalls. The sidewalls include vertically extending rearward corner portions that define air passageways for directing rearwardly flowing air from alongside the sidewalls toward a region of low pressure behind the rearward end portion of the enclosure. Preferably, the rearward corner portions include vertically extending rearward corner posts and deflector components that are formed to cooperatively define circularly shaped passageways for gradual air-flow redirection, with the sidewall exterior surfaces and the deflector exterior surfaces being within prescribed maximum semi-trailer widths while the interior corner post spacing does not reduce the usual width of semi-trailer cargo space. Offset door hinges are included that enable rear doors to open fully to positions parallel to the exterior surfaces of the enclosure sidewalls despite the left and right air-deflecting structures that extend sideways beyond the left and right sidewalls.

10 Claims, 11 Drawing Sheets

CARGO VEHICLE WITH DRAG REDUCTION

CROSS REFERENCE TO RELATED APPLICATION

This application is a continuation in part of copending and commonly owned U.S. patent application Ser. No. 12/080,654 filed Apr. 4, 2008 by the same inventor as this application.

BACKGROUND OF THE INVENTION

1. Technical Field

This invention relates generally to the trucking industry and to methods and structure for improving vehicle aerodynamics for better fuel efficiency. It relates more particularly to a semi-trailer or other cargo vehicle having a rear end drag-reducing design.

2. Description of Related Art

The term "cargo vehicle" herein refers to a semi-trailer or other wheeled ground vehicle used for hauling cargo on roads and highways. A typical semi-trailer, for example, includes a large rectangularly shaped, box-like enclosure having a forward end, a rearward end, opposite left and right sidewalls, and opposite floor and roof portions. The left and right sidewalls extend from the forward end to left and right rearward corner portions of the enclosure, with the rearward end being somewhat flat and extending transversely across the direction of forward vehicle travel between the left and right rearward corner portions.

So configured, a cargo vehicle provides efficient use of the space that is available within the size limitations set by various vehicle laws and regulations. Its flat-back design of the rearward end, however, creates a low-pressure region behind the rearward end during forward motion. The low-pressure region results in drag and a corresponding higher rate of fuel consumption.

Numerous semi-trailer refinements and after-market add-on components have been proposed and patented that reduce rear end drag of flat-back enclosures in order to thereby alleviate the fuel-consumption concern. Many existing designs, however, have certain drawbacks. Some include components that extend rearwardly of the enclosure rear end portion where they interfere with the rear doors and with loading dock operations. Others involve complicated and expensive components.

Still other designs require truck-driver participation in installing, removing, and/or adjusting the position of various add-on components. And yet other designs add components that extend laterally beyond maximum width limitations set by laws and regulations, while those that fit within such maximum width limitations are often too restricted in size to function satisfactorily. Thus, the trucking industry needs a better drag-reducing design for the rearward end of vehicles.

The parent application (i.e., U.S. patent application Ser. No. 12/080,654 filed Apr. 4, 2008) describes a cargo vehicle enclosure with left and right rearward corner portions having built-in air deflectors. The left and right rearward corner portions define left and right air passageways that gradually redirect air flowing rearwardly alongside the left and right sidewalls toward a region of low pressure behind the rearward end portion of the enclosure, while avoiding complicated and expensive structure, avoiding interference with truck docking platform operations, requiring no assembly by the vehicle driver, and fitting within the size limitations of various laws and regulations.

Various existing laws and regulations set a 102.375-inch maximum semi-trailer width, plus six inches extra for approved safety equipment and so forth; the total maximum width equals 108.375 inches. Thus, existing add-on deflectors can only be a maximum of three inches wide. By building the deflector in as part of the corner post, each rearward corner portion, and the curved passageway it defines, can occupy 4.1875" of semi-trailer width without affecting the typical 100.0-inch interior width of the enclosure (i.e., the cargo space). The drag-reducing design makes use of the maximum available semi-trailer width without reducing cargo space.

One embodiment of the enclosure includes left and right rear doors that are multi-panel folding doors (e.g., bi-folding doors). They move to wide-open positions of the doors in which the left and right doors extend outside of the left and right deflector components and forwardly alongside the left and right sidewalls. The doors have jamb panels to which main panels are connected by hinges. Although effective in many respects, the multi-panel bi-folding doors described in the parent application involve some cost and complexity. Thus, a need exists for a better rear door structure on the enclosure.

SUMMARY OF THE INVENTION

In view of the foregoing, it is a primary object of the present invention to provide an improved rear door structure for a cargo vehicle having left and right air-deflecting structures that extend sideways beyond the left and right sidewalls. The present invention achieves this objective by providing left and rear doors mounted with offset hinges that enable movement of the left and rear doors to fully open positions parallel to the left and right sidewalls of the enclosure. Cost and complexity are reduced.

To paraphrase some of the more precise language appearing in the claims and further introduce the nomenclature used, a cargo vehicle enclosure constructed according to the invention includes a rearward end portion and opposite left and right sidewalls extending to the rearward end portion in horizontally spaced-apart vertically extending positions. The left sidewall includes a left rearward corner portion and the right sidewall includes a right rearward corner portion such that the left and right rearward corner portions define the left and right air passageways for directing air flowing rearwardly alongside the left and right sidewalls toward a region behind the rearward end portion of the enclosure.

According to a major aspect of this continuation-in-part application, the enclosure includes a left and right rear doors that are mounted on respective ones of the left rearward corner portion and the right rearward corner portion with a plurality of offset hinges. The offset hinges are such as to enable a user to move the left and right rear doors to fully open positions in which a plane containing a left rear door exterior surface is parallel to a plane containing a left sidewall exterior surface and a plane containing a right rear door exterior surface is parallel to a plane containing a right sidewall exterior surface.

Thus, the invention provides a cargo vehicle enclosure that directs air toward a region of low pressure behind the rearward end portion of the enclosure while avoiding complicated and expensive structure, avoiding interference with truck docking platform operations, requiring no assembly by the vehicle driver, and fitting within the size limitations of various laws and regulations. All this is augmented by rear doors that a user can move to fully open positions parallel to the enclosure sidewalls without the cost and complexity of multi-panel bi-folding doors described in the parent application.

DESCRIPTION OF THE PREFERRED EMBODIMENTS

The following description proceeds with a Parent Application Information section of the specification that restates much of the information contained in the specification and FIGS. 1-5 of the parent application (i.e., U.S. patent application Ser. No. 12/080,654 filed Apr. 4, 2008). Thereafter follows a description of the preferred embodiments of the present invention in a Rear Door Structure section of the specification that includes references to FIGS. 6-10. A reader already familiar with the specification and FIGS. 1-5 of the parent application, may proceed directly to the information in the Rear Door Structure section.

Figure 1:
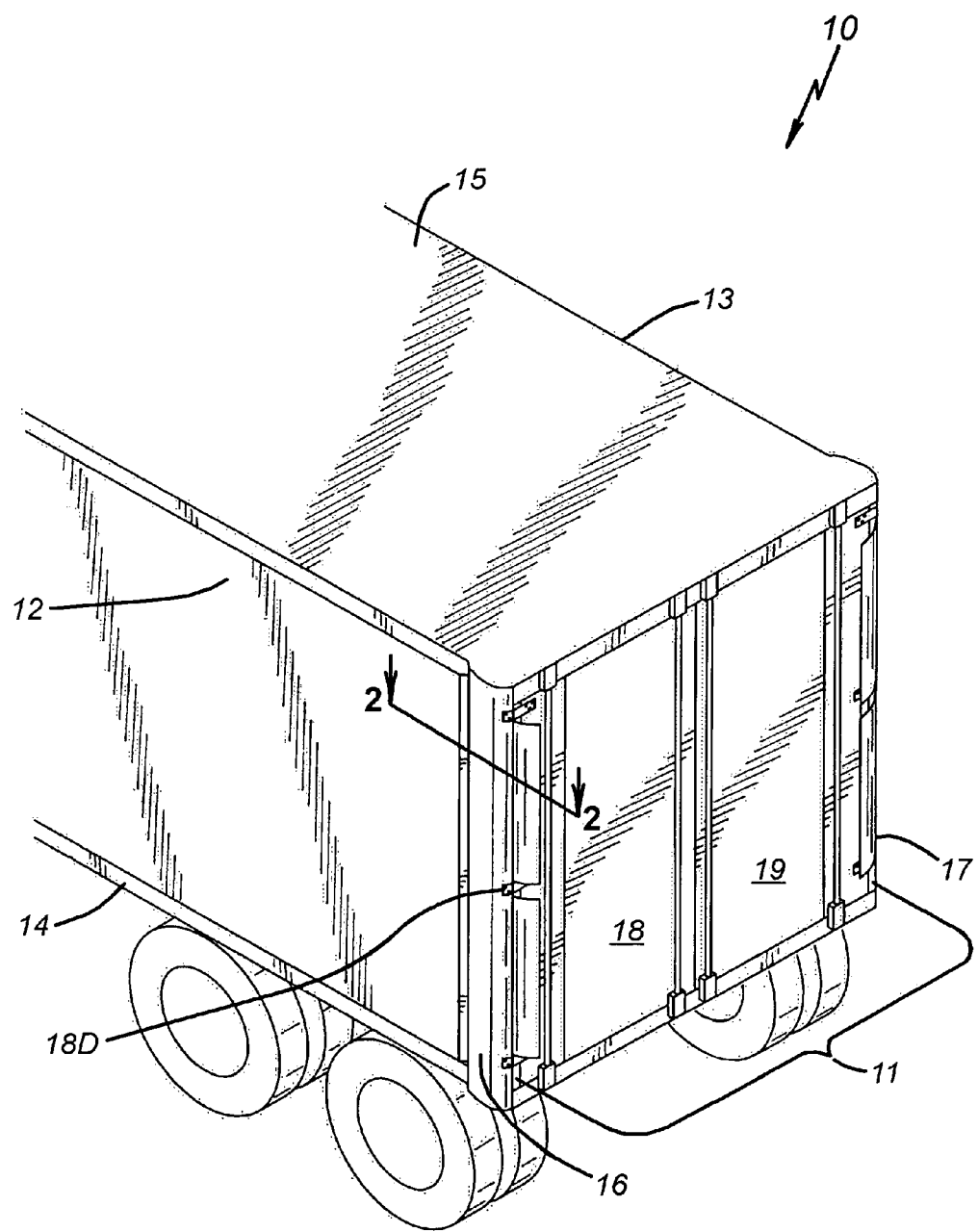
FIG. 1 of the drawings is perspective view of the rear end portion of a semi-trailer enclosure constructed according to the invention.

Parent Application Information. FIG. 1 of the drawings is a perspective view of a portion of a semi-trailer enclosure 10 constructed according to the parent-application invention. Generally, the enclosure 10 includes a rearward end portion 11 that extends vertically between the levels of floor and roof portions 14 and 15 of the enclosure 10. The rearward end portion 11 extends laterally between opposite left and right sidewalls 12 and 13 also, as indicated by a bracket in FIG. 1. The left and right sidewalls 12 and 13 extend vertically in horizontally spaced-apart positions between the levels of the floor and roof portions 14 and 15, and rearwardly to the rearward end portion 11. Those components of the enclosure 10 may be similar in many respects to existing semi-trailer enclosures.

Unlike existing semi-trailer or other cargo vehicle enclosures, however, the enclosure 10 has built-in drag reducing components. According to a major aspect of the invention, the left sidewall 12 includes a left rearward corner portion 16, the right sidewall 13 includes a right rearward corner portion 17, and the left and right rearward corner portions 16 and 17 define air drag-reducing air passageways within the width limitations prescribed for semi-trailers and without sacrificing interior cargo space. They are also referred to herein as left and right air-deflecting structures that extend sideways (i.e., laterally) beyond the left and right sidewalls 12 and 13. During forward motion of the enclosure 10, the drag-reducing air passageways gradually redirect air flowing alongside the left and right sidewalls 12 and 13 to a region behind the rearward end portion 11. To accommodate the structure of the left and right rearward corner portions 16 and 17, the rearward end portion 11 of the enclosure 10 includes multi-panel left and right rear doors 18 and 19 that open fully around the left and right rearward corner portions 16 and 17; they are illustrated in fully closed positions in FIG. 1.

Figure 2:
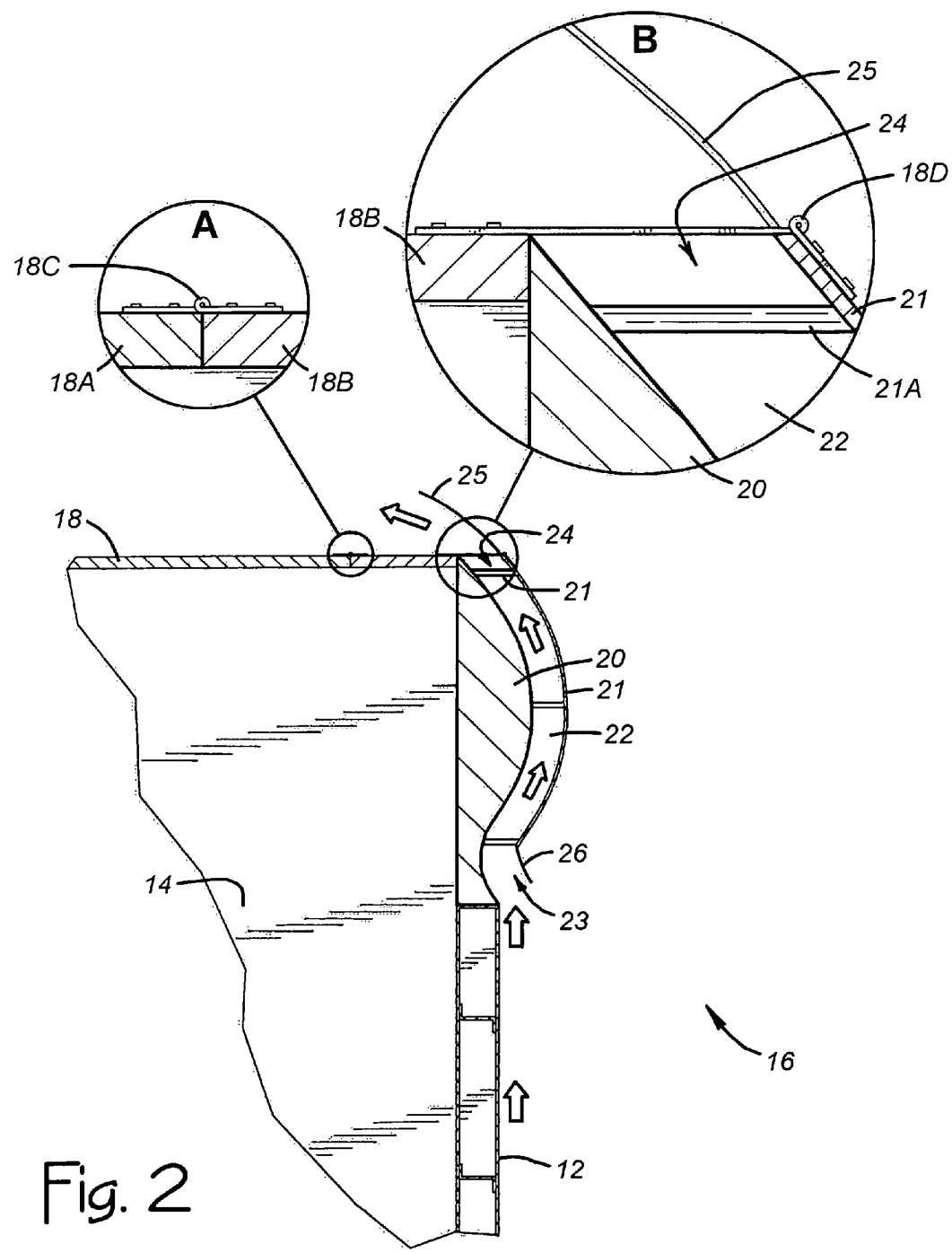
FIG. 2 of the drawings is a cross sectional view of the left rearward corner portion of the semi-trailer enclosure with the left rear door closed, as viewed downwardly in a horizontal cross sectional plane containing a line 2-2 in FIG. 1.
Figure 3:
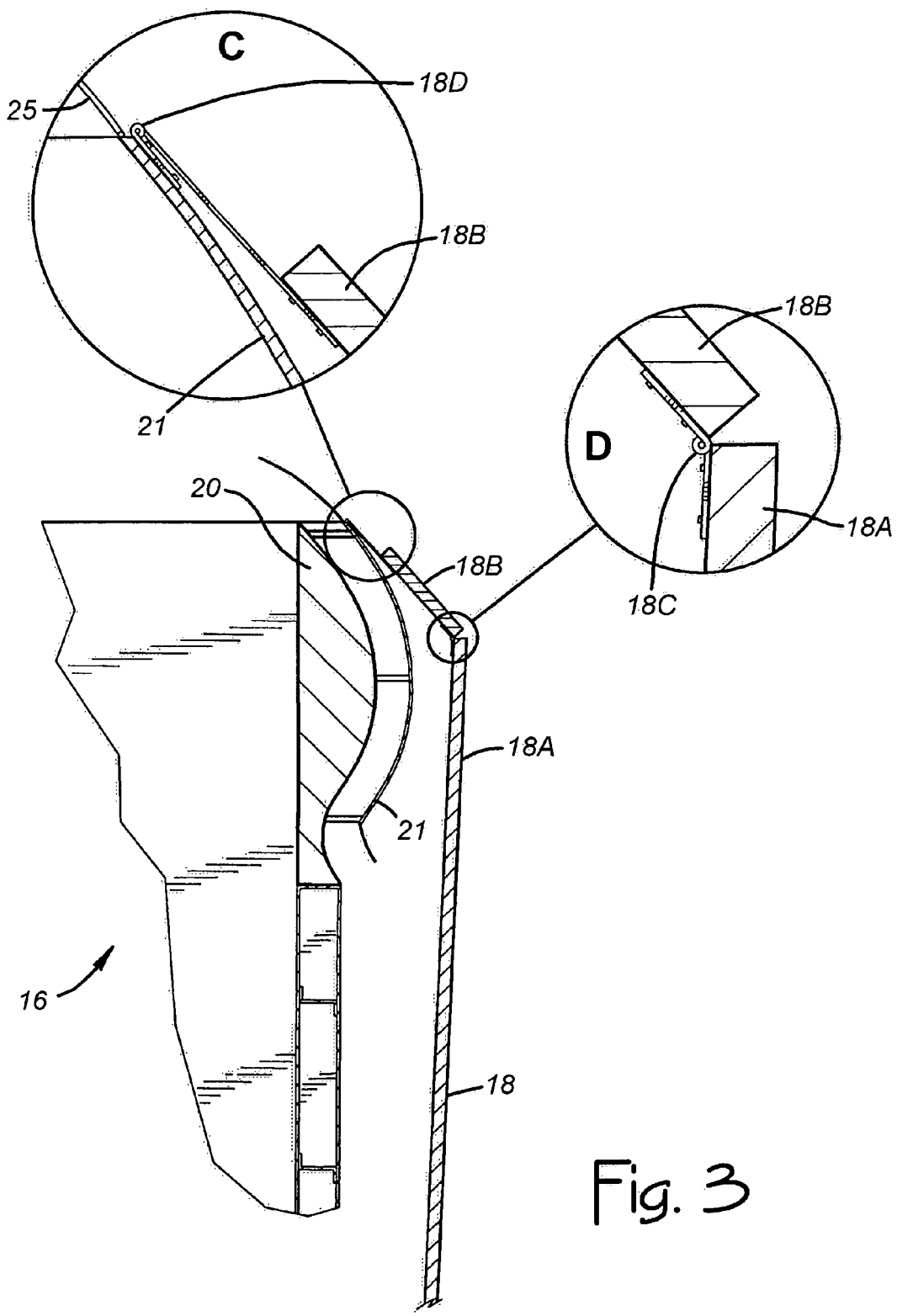
FIG. 3 is a cross sectional view similar to FIG. 2 of the left rearward corner portion with the left rear door open.
Figure 4A:
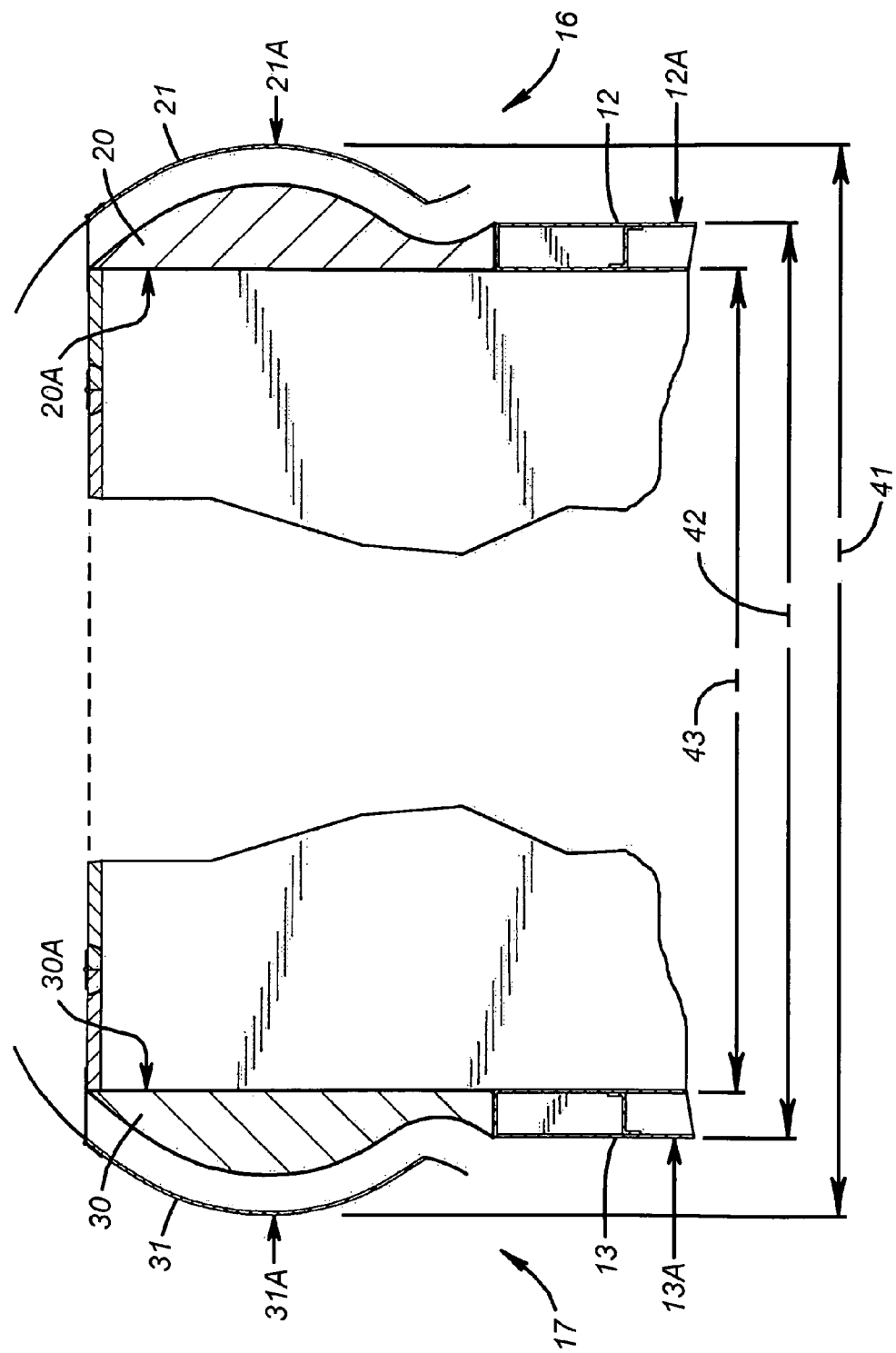
FIG. 4a is a cross sectional view of the left and right rearward corner portions showing important dimensioning.

Further details of the left rearward corner portion 16 is shown in FIGS. 2, 3, and 4a. The left and right rearward corner portions 16 and 17 are generally similar and so only the left rearward corner portion 16 is illustrated in FIGS. 2 and 3. Consider FIG. 2 first. It shows that the left rearward corner portion 16 includes a left rearward corner post component 20 and a left deflector component 21. Those components are composed of a suitably strong, rigid, durable material (e.g., steel) and they extend vertically, intermediate the levels of the floor and roof portions 14 and 15 identified in FIG. 1. They are spaced apart laterally (i.e., transverse to the direction of forward motion) to define a left air passageway 22. The left air passageway 22 extends rearwardly from a left inlet end 23 of the left air passageway 22 that faces forwardly to a left outlet end 24 of the left air passageway 22 that faces toward the region behind the rearward end portion 11 of the enclosure 10 (a region located behind and proximate the fully closed left and right rear doors 18 and 19).

The left deflector component 21 is attached to the left rearward corner post component 20 by suitable interconnection means (e.g., bolts or flat struts welded in place), with the left air passageway 22 being generally coextensive vertically and rearwardly with the left rearward corner post component 20 and the left deflector component 21. One bolt 21A is identified in FIG. 2; it represents the interconnection means connecting the left rearward corner post component 20 and the left deflector component 21. Based upon the information provided herein, one of ordinary skill in the art can readily implement suitable connection means.

The left air passageway 22 extends rearwardly from the left inlet end 23 to the left outlet end 24 along a circularly shaped path (e.g., an arc of about forty-five to ninety degrees of a full circle). With the semi-trailer moving forwardly, air enters the left inlet end 23, flows along the circularly shaped path of the left passageway 22, and exits the left outlet end 24 directed toward the region behind the left and right rear doors 18 and 19. That air flow is depicted by five arrow outlines in FIG. 2. Extending along a circularly shaped path that way, the left air passageway 22 provides a gradual change in air flow direction from the left inlet end 23 to the left outlet end 24. There is no abrupt right-angle corner of the type provided by some add-on air deflectors. There are not the air turbulence and air-flow-disrupting pressure of a right-angle corner.

The circular shaped path of the left air passageway 22 combines with a flexible left outlet flap 25 (e.g., rubber) that is attached to the left deflector component at the left outlet end 24 to help direct the flow of air laterally to the region behind the left and right rear doors 18 and 19. A left inlet flap 26 helps direct air into the left inlet end 23 while providing a guard structure over the forward edge of the left deflector component 21. Based upon the information provided herein, one of ordinary skill in the art can readily implement an enclosure rearward corner portion according to the invention (with or without such inlet and outlet flaps).

With further reference to FIG. 2, the enlarged portion of the left rear door 18 that is shown within a circle A in FIG. 2 shows that the left rear door 18 is a multi-panel door (i.e., a bi-folding door). That configuration allows the left rear door 18 to be moved from the closed position shown in FIG. 2 to the fully open position shown in FIG. 3 despite the lateral protrusion of the left rearward corner portion 16 beyond the rest of the left sidewall 12. In other words, the left rear door 18 is adapted to be moved to an open position of the left rear door 18 such that when in the open position the left rear door 18 extends forwardly outside of the left deflector component 21 and alongside the left sidewall 12. The right rear door 19 is similar in construction.

More specifically, the enlarged detail in the circle A shows that the left rear door 18 includes a first or main panel 18A that is hinged to a second or jamb panel 18B. In other words, the main panel 18A is connected by multiple hinges 18C to the jamb panel 18B. The enlarged portion of the left rearward door 18 shown within a circle B in FIG. 2 shows that the jamb panel 18B is hinged to the left deflector component 21; it is connected by multiple hinges 18D to the left deflector component 21. One hinge 18D is identified in FIG. 1 for further reference. Preferably, some of the interconnecting bolts 21A (or other interconnecting structures) are located at or near the connection of the hinges 18D to the left deflector component 21 for structural reinforcement purposes.

Turning now to FIG. 3, it shows the left rear door 18 in a fully open position. In the fully open position, the left jamb panel 18B extends forwardly and sideways relative to the left sidewall 12 of the enclosure 10 in order to clear the left deflector component 21. The left main panel 18A extends forwardly from the left jamb panel 18B alongside the left sidewall 12. Enlarged portions of the fully open left rear door 18 are provided in circles C and D to illustrate the positions of hinges 18C and 18D.

FIG. 4a concerns the dimensional aspects of the enclosure 10. In addition to the left rearward corner portion 16 already described, FIG. 4a includes the right rearward corner portion 17. The right rearward corner portion 17 includes a right rearward corner post component 30 and a right deflector component 31 that define a right air passageway 32.

The left deflector component includes a left deflector component exterior surface 21B, the right deflector component includes a right deflector component exterior surface 31A, and the maximum distance between the left and right deflector component exterior surfaces 21B and 31A (a dimension 41 in FIG. 4a) is no more than about 108.375 inches. That amount is six inches more than the prescribed 102.375-inch usual semi-trailer width maximum, but within the additional six-inch overage allowed for approved safety equipment and so forth.

In addition, the left sidewall 12 has a left sidewall exterior surface 12A that is located forward of the left rearward corner portion 16, the right sidewall 13 has a right sidewall exterior surface 13A that is located forward of the right rearward corner portion 17, and the maximum distance between the left and right sidewall exterior surfaces 12A and 13A is no more than about 102.375 inches, the prescribed usual semi-trailer width maximum (a dimension 42 in FIG. 4a. Beyond that, the left rearward corner post component 20 includes a left rearward corner post component interior surface 20A, the right rearward corner post component 30 includes a right rearward corner post component interior surface 30A, and the left and right rearward corner post component interior surfaces 20A and 30A are separated by no less than about 100.0 inches, the usual semi-trailer interior cargo space width (a dimension 43 in FIG. 4a. Refrigerated and insulated trailers can be less than 100.0 inches wide (e.g., 98.0 inches).

Figure 4B:
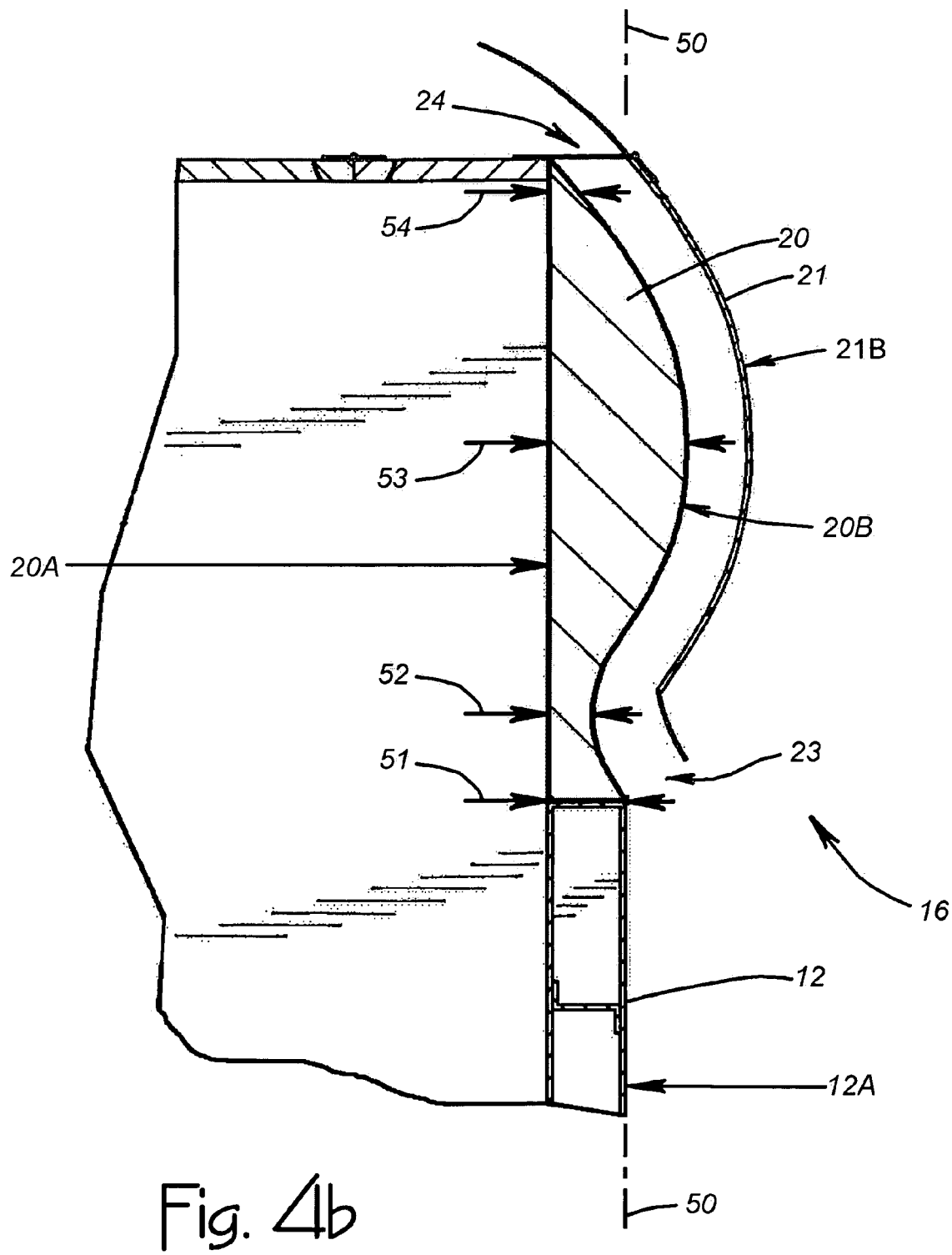
FIG. 4b is an enlarged portion of FIG. 4a that identifies four thickness of the left rearward corner post component and a plane containing the exterior surface of the left sidewall.

FIG. 4b is an enlarged portion of FIG. 4a. It shows a plane 50 that contains the left sidewall exterior surface 12A. In addition, FIG. 4b identifies four thicknesses 51, 52, 53, and 54 of the left rearward corner post component 20 that are referred to in the claims.

Figure 5:
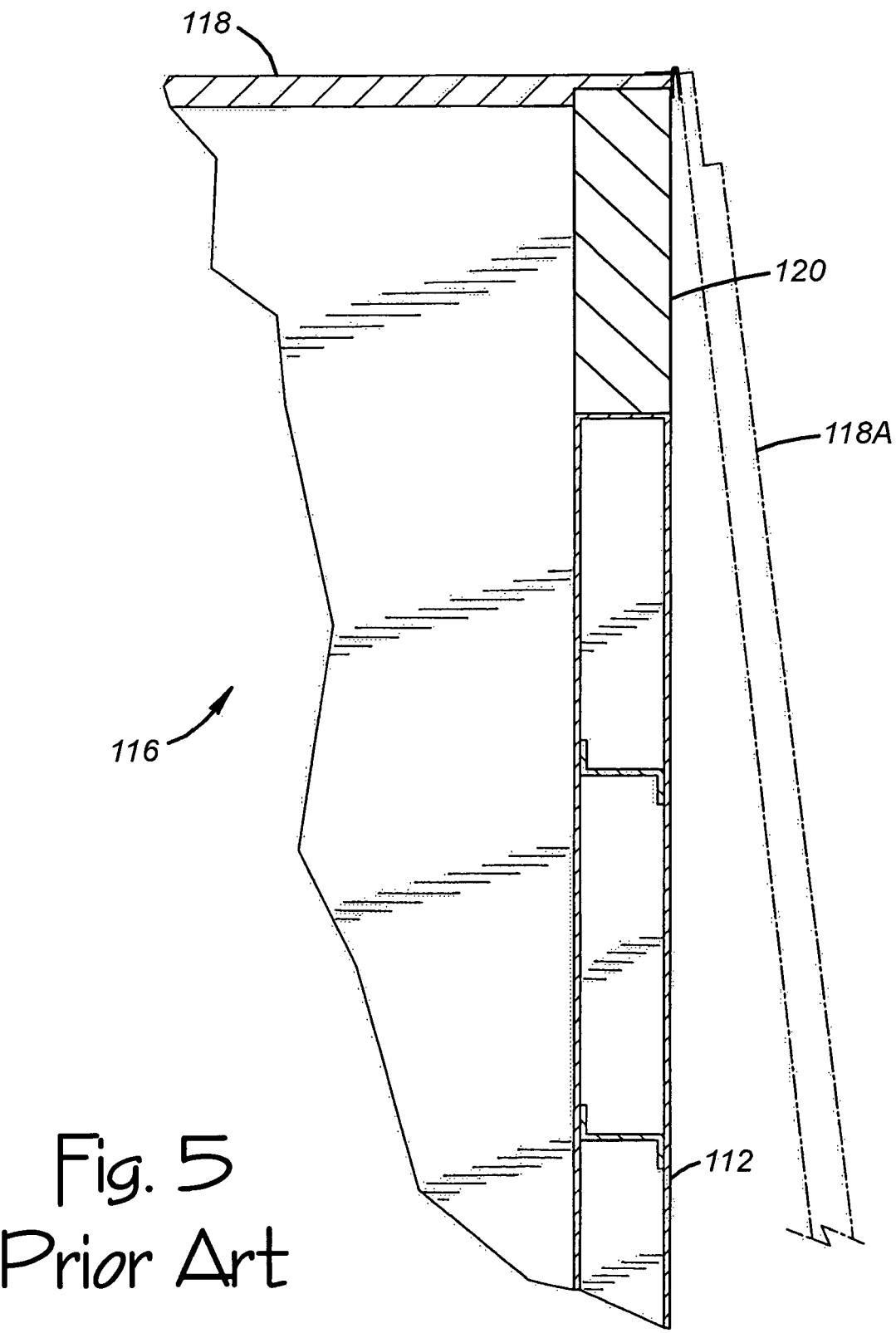
FIG. 5 is a cross sectional view similar to FIG. 2, but of the left rearward corner portion of a prior art semi-trailer enclosure.
Figure 6:
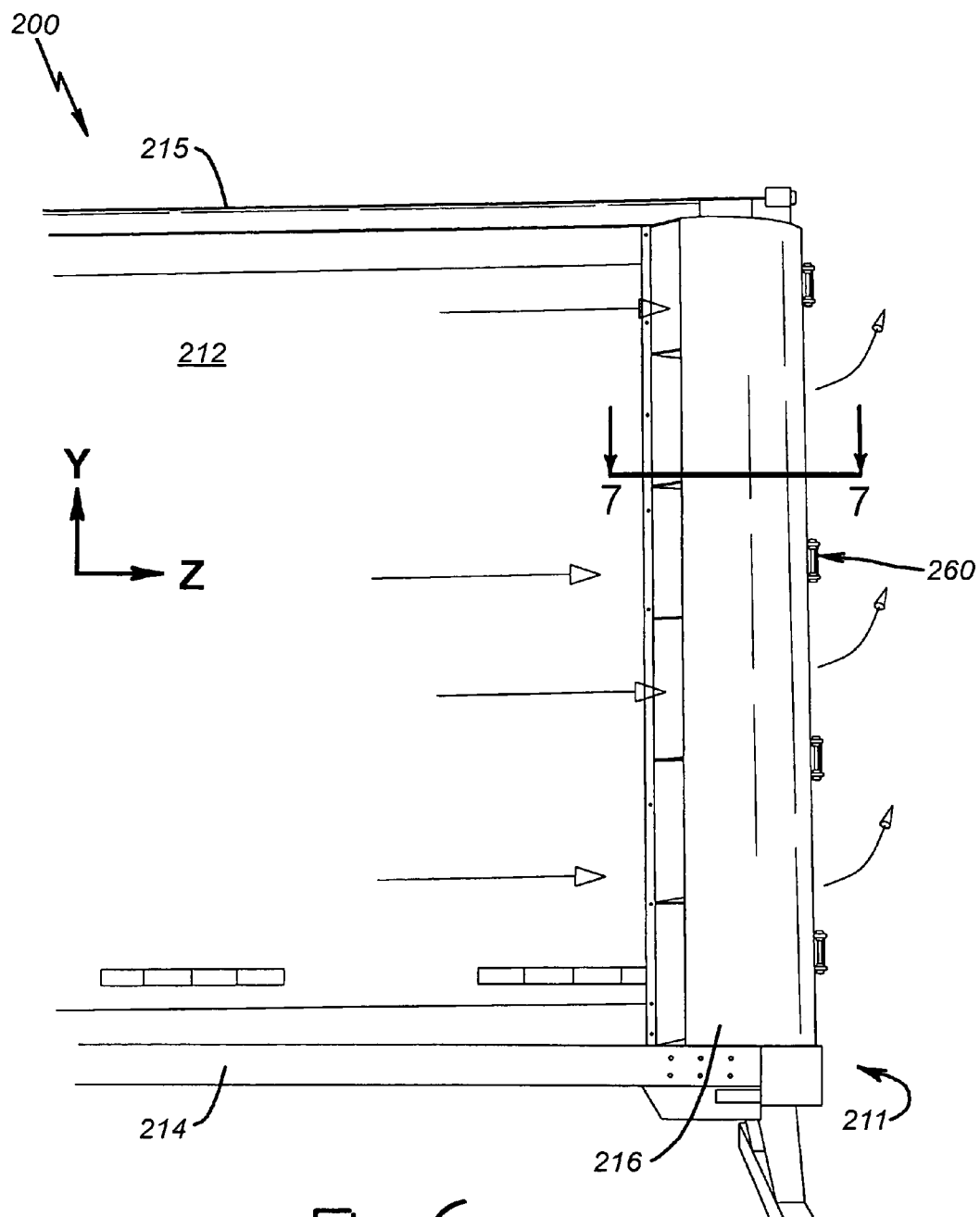
FIG. 6 is a left side elevation view of a second embodiment of the invention that includes an offset-door-hinge arrangement, with the Y axis and the Z axis of an X-Y-Z Cartesian coordinate system included for convenience in describing various spatial relationships.

FIG. 5 shows the existing semi-trailer left rearward corner portion 116 for comparison purposes. It includes a left rear door 118 shown in a fully closed position. The left rear door 118 is hinged to a left rearward corner post component 120 that is part of a left sidewall 112. Phantom lines identified by reference numeral 118A depict the left rear door 118 in its fully open position.

Rear Door Structure. Now consider FIGS. 6-10. They show various aspects of a semi-trailer enclosure 200 constructed according to the present invention that includes an offset hinge arrangement for the left and right rear doors. The semi-trailer enclosure 200 is similar in many respects to the semi-trailer enclosure 10 in the Parent Application Information section of this application. Only the significant differences are described in further detail. For convenience, reference numerals identifying parts of the semi-trailer enclosure 200 are increased by two hundred over the reference numerals identifying similar, corresponding, and/or related parts of the semi-trailer enclosure 10.

Generally, the enclosure 200 (FIGS. 6-10) includes a rearward end portion 211 (FIGS. 6 and 9) that extends vertically between the levels of floor and roof portions 214 (FIGS. 6, 7, 8, and 9) and 215 (FIG. 6) of the enclosure 200. The rearward end portion 211 extends laterally between opposite left and right sidewalls, with only the sidewall 212 being visible in FIGS. 6-10 of the drawings. The left sidewall 212 extends vertically between the levels of the floor and roof portions 214 and 215 and rearwardly to the rearward end portion 211, and it includes a left rearward corner portion 216 (FIGS. 7 and 8) that defines a left drag-reducing air passageway 222 (FIG. 7) that may be of uniform or nonuniform cross section. The left rearward corner portion 216 is also referred to herein as a left air-deflecting structure that extends sideways (i.e., laterally) beyond the left sidewall 112. During forward motion of the enclosure 200, the left drag-reducing air passageway 222 gradually redirects air flowing alongside the left sidewall 212 to a region behind the rearward end portion 211 as depicted by arrows in FIGS. 6, 7, 9, and 10. A right drag-reducing air passageway (not illustrated) defined by a right rearward corner portion (not shown) functions in much the same way and it is also referred to herein as a right air-deflecting structure that extends sideways (i.e., laterally) beyond the right sidewall. The above-mentioned components of the enclosure 210 may be similar in many respects to those of the enclosure 10 described in the Parent Application Information section of this description.

According to a major aspect of the present invention, the rearward end portion 211 of the enclosure 200 includes left and right rear doors (e.g., existing off-the-shelf doors) having offset door hinges in order to clear the sideways-extending structure of the left and right rearward corner portions when the doors are moved to fully open positions. The left and right rear doors open fully around the left and right rearward corner portions. That feature is illustrated for a left rear door 218

Figure 7:
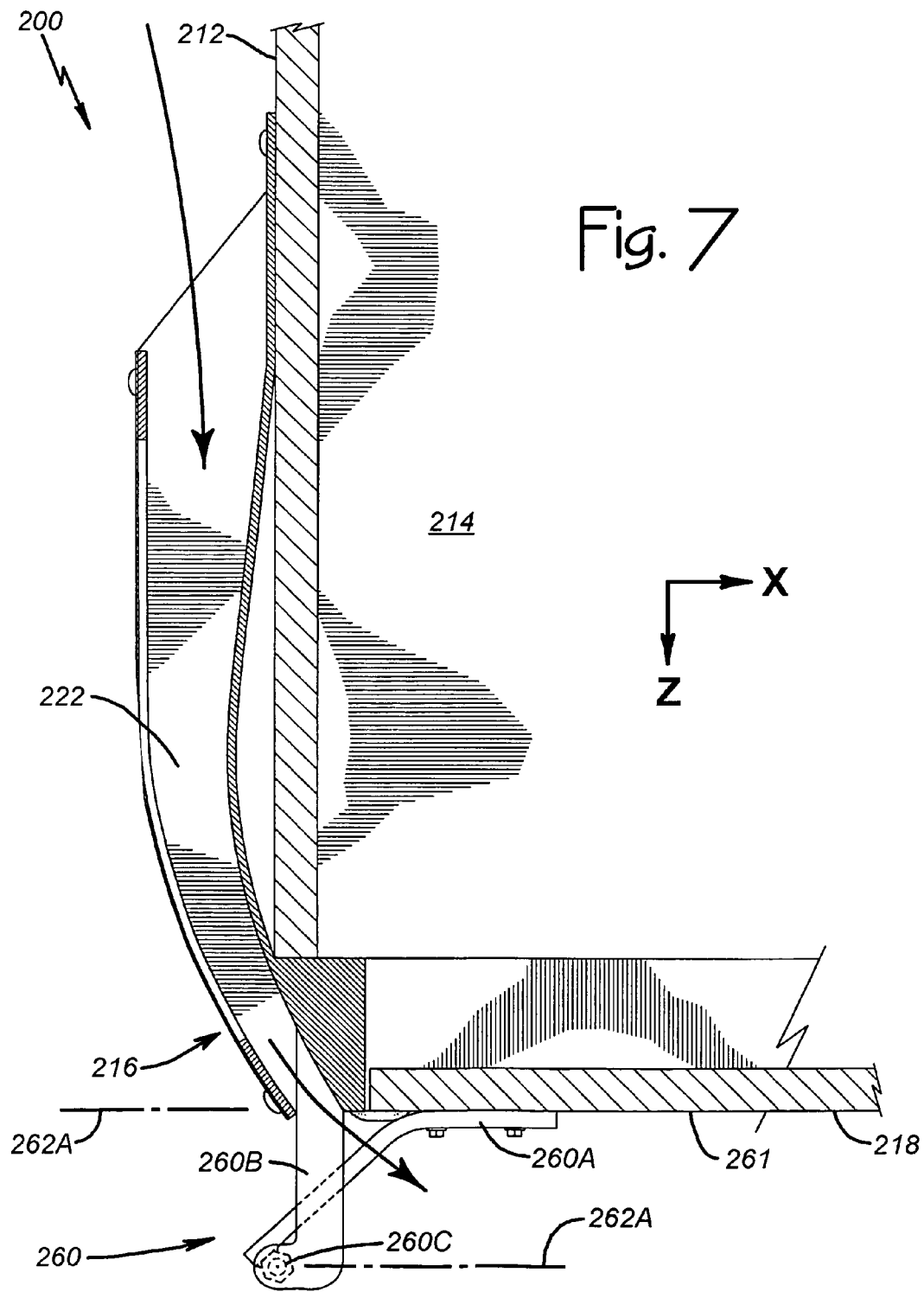
FIG. 7 is a cross sectional view of the second embodiment as viewed in a horizontal plane containing a line 7-7 in FIG. 6, with the X axis and the Z axis of the X-Y-Z Cartesian coordinate system included.
Figure 8:
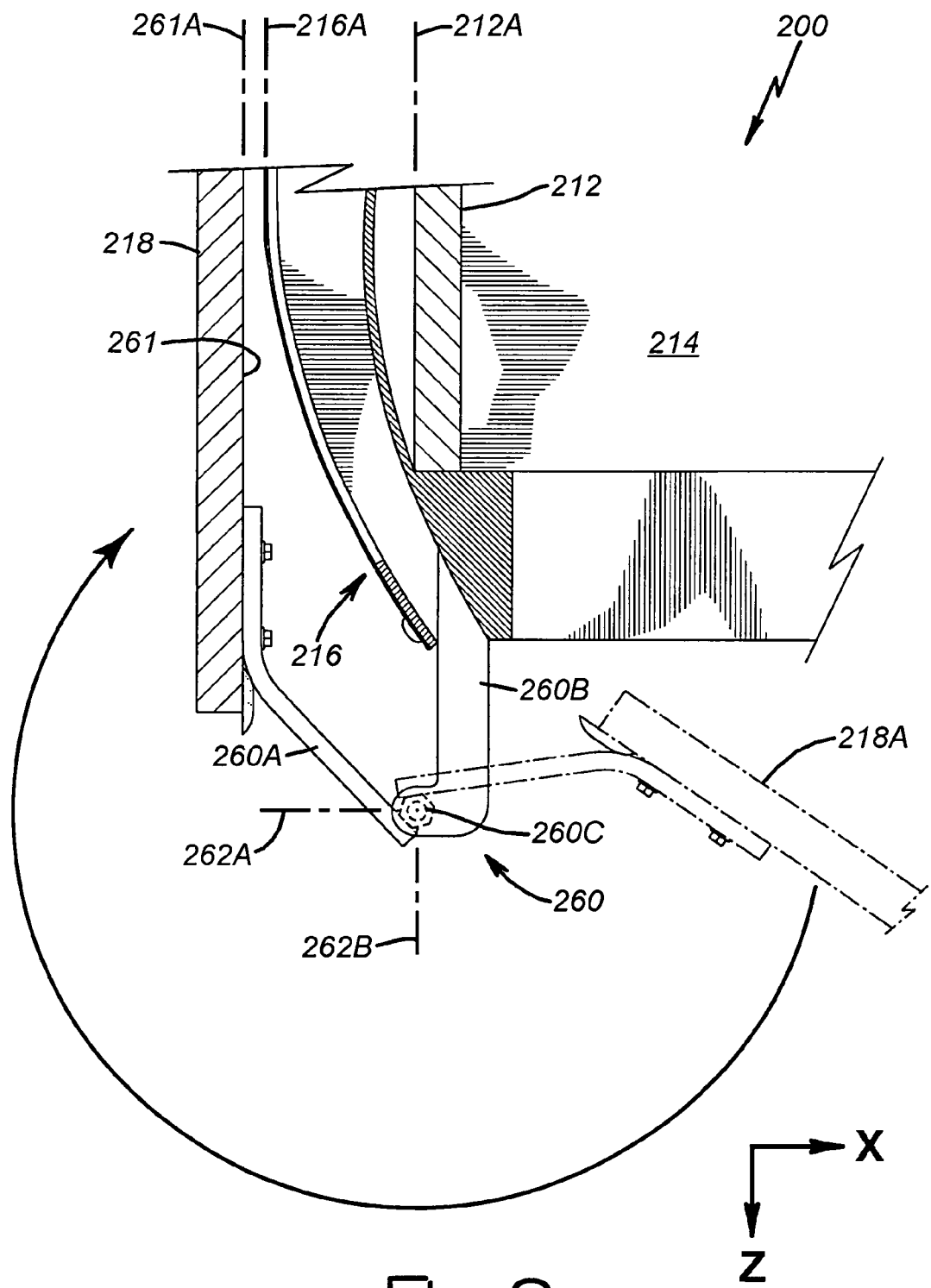
FIG. 8 is a cross sectional view similar to FIG. 7 showing door-hinge operation, with the X and Z axes shown.
Figure 9:
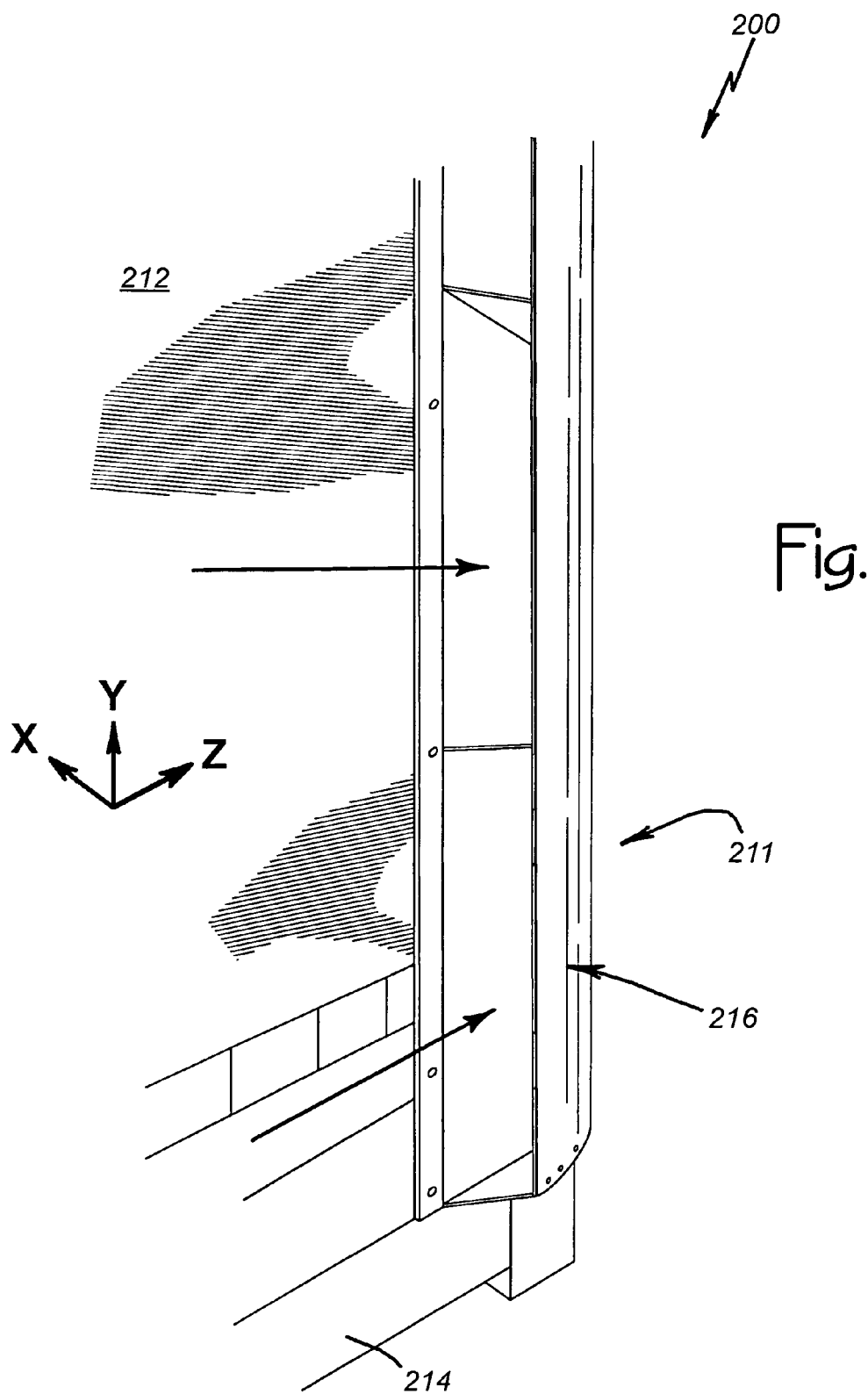
FIG. 9 is an elevation view of the left inlet end of the left drag-reducing air passageway, with all three axes of the X-Y-Z Cartesian coordinate system shown.
Figure 10:
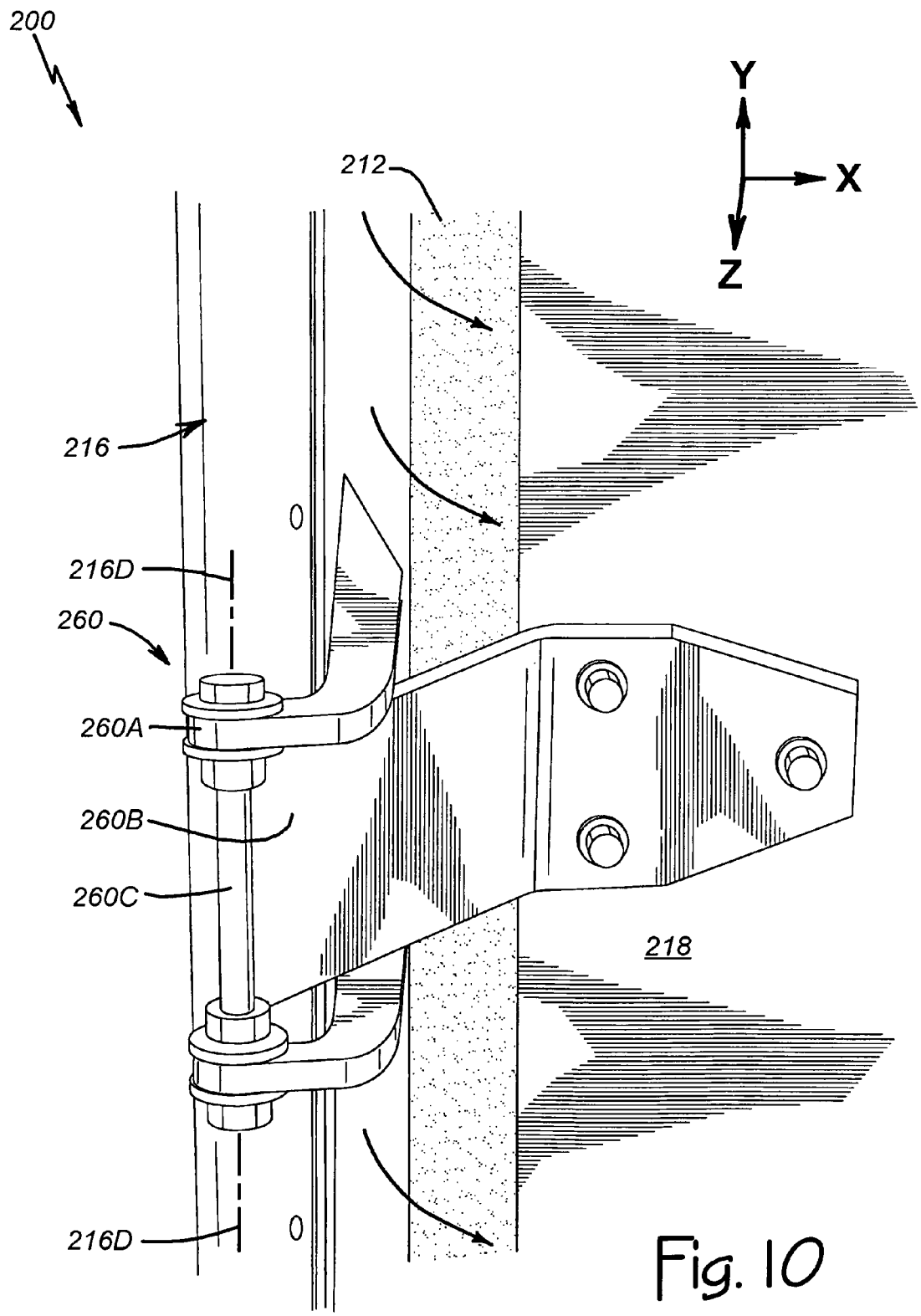
FIG. 10 is an enlarged perspective view of a portion of the left door structure and the left outlet end of the left drag-reducing air passageway in the vicinity of one of the door hinges, with the X and Y axes shown.

(FIGS. 7, 8, and 10). The left rear door 218 is in a fully closed position in FIGS. 6, 7, 9, and 10, it is shown pivoted 270 degrees in FIGS. 8 and 10 (from the fully closed position to a fully open position), and it is shown in an intermediate position in FIG. 8 by phantom lines at reference numeral 218A). Only the left rear door 218 is visible in FIGS. 7, 8, and 9 of the drawings and only one of the door hinges is identified (i.e., a door hinge 260 in FIGS. 6, 7, 8, and 10), but the right rear door and the other door hinges are constructed in a manner similar to that described.

As shown in FIGS. 7, 8 and 10, the door hinge 260 includes a first component 260A (sometimes called a "door wing" component of the hinge) that is bolted, welded, or otherwise suitably attached to a marginal edge portion of the left rear door 218. The door hinge 260 also includes a second component 260B (sometimes called a "frame wing" of the hinge) that is bolted, welded, or otherwise suitably attached to the left rearward corner portion 216. The first and second hinge components 260A and 260B are coupled together pivotally by a hinge pin 260C so that the first hinge component 260A is free to pivot relative to the second hinge component 260B about a hinge pivotal axis 260D that is identified in FIG. 10.

The left rear door 218 has an exterior surface 261 (FIGS. 7 and 8) that faces rearwardly when the door is closed. The hinge 260 is an offset hinge in the sense that the hinge pivotal axis 260D is offset from alignment with the exterior surface 261. In other words, the hinge pivotal axis 260D is offset from alignment with a plane 261A that contains the exterior surface 261. The plane 261 is identified in FIGS. 7 and 8. In a fully closed position of the left rear door 218 (FIG. 7), the plane 261 is parallel to the X-Y plane of the Cartesian coordinate system provided in FIGS. 6-10. In a fully open position of the left rear door 218 (FIG. 8), the plane 261 is parallel to the Y-Z plane of the Cartesian coordinate system. The hinge components are configured to achieve that result in the sense that they are shaped and dimensioned so that the hinge pivotal axis is offset as described above.

The hinge 260 is constructed so that the amount of pivotal axis offset is sufficient to enable the left rear door 218 to clear the left rearward corner portion 216 when it is opened. The amount of offset is set in consideration of a sideways facing vertical exterior surface of the sidewall 212 that is contained by a vertical plane 212A in FIG. 8, and in consideration of a sideways facing vertical exterior surface of the left rearward corner portion 216 that is contained by a vertical plane 216A in FIG. 8. Both the plane 212A and the plane 216A are parallel to the Y-Z plane of the Cartesian coordinate system, and the amount of offset compensates for the distance between those two planes (typically three inches for the illustrated enclosure).

The amount of offset is the distance between a vertical plane 262A extending through the pivotal axis 260C parallel to the X-Y plane (FIGS. 7 and 8) and the plane 261A of the left door exterior surface 261 when the left rear door 218 is fully closed. For the illustrated position of the pivotal axis 260C in FIGS. 7 and 8 (i.e., a position such that a vertical plane 262B extending in FIG. 8 through the pivotal axis 260C parallel to the Y-Z plane coincides with the plane 212A), the amount of offset is the same or greater than the distance between the plane 212A and the plane 216A in FIG. 8. That offset enables the door 218 extend parallel to the left sideway 212 and to clear the left rearward corner portion 216 in the fully open position (or just barely touch it). The offset may be a little greater than the minimum required with the result that the plane 261A and the plane 216A are spaced apart slightly in the fully open position of the rear door 218, as shown in FIG. 8. From the foregoing description, one of ordinary skill in the art can readily implement a hinge structure according to the invention, and he may do so by moving the position of the pivotal axis 260C toward the left margin of the drawing sheet on which FIG. 8 appears while moving it an equal amount toward the top of the drawing sheet. The illustrated position is preferred, however, because the hinge 260 does not extend sideways beyond the plane 212A significantly when the door 218 is in a fully closed position.

Thus, the invention provides a cargo vehicle enclosure that gradually redirects air toward a region of low pressure behind the rearward end portion of the enclosure while avoiding complicated and expensive structure, avoiding interference with truck docking platform operations, requiring no assembly by the vehicle driver, and fitting within the size limitations of various laws and regulations, doing so with less costly and less complicated rear door structure. Although an exemplary embodiment has been shown and described, one of ordinary skill in the art may make many changes, modifications, and substitutions without necessarily departing from the spirit and scope of the invention. As for the specific terminology used to describe the exemplary embodiment, it is not intended to limit the invention; each specific term is intended to include all technical equivalents that operate in a similar manner to accomplish a similar purpose or function.

What is claimed is:
1. A cargo vehicle enclosure, comprising:
a rearward end portion; and
opposite left and right sidewalls extending to the rearward end portion in horizontally spaced-apart vertically extending positions;
wherein the left sidewall includes a left rearward corner portion;
wherein the right sidewall includes a right rearward corner portion; and
wherein the left and right rearward corner portions define left and right air passageways that direct air flowing rearwardly alongside the left and right sidewalls toward a region behind the rearward end portion of the enclosure;
wherein at least the left rearward corner portion includes a vertically extending left rearward corner post component and a vertically extending left deflector component that cooperatively define the left air passageway;
wherein at least the left air passageway extends along a circularly shaped path, as viewed in a horizontal cross sectional plane through the left rearward corner portion, from a left inlet end that faces forwardly to a left outlet end that faces toward the region behind the rearward end portion of the enclosure;
wherein the left corner post component has a generally planar inwardly directed surface, a curved outwardly directed surface, and a nonuniform thickness between the inwardly and outwardly directed surfaces as viewed in a horizontal cross sectional plane through the left rearward corner portion, said nonuniform thickness including:
a first thickness of the left corner post component at the left inlet end of the left air passageway at which the outwardly directed surface of the left corner post component lies within a plane containing a left sidewall exterior surface;
a second thickness of the left corner post component at which the outwardly directed surface of the left corner post component lies laterally inward of the plane containing the left sidewall exterior surface;

a third thickness of the left corner post component at which the left corner post component lies laterally outward of the plane containing the left sidewall exterior surface; and a fourth thickness of the left corner post component at the left outlet end of the left passageway at which the outwardly directed surface of the left corner post component lies laterally inward of the plane containing the left sidewall exterior surface;

whereby the curved outwardly directed surface of the left corner post component facilitates defining the left air passageway within vehicle width limitations;

said cargo vehicle enclosure further comprising at least one rear door that is mounted on one of the left and right rearward corner portions with a plurality of offset hinges that enable said rear door to be moved to a fully open position of said rear door in which a plane containing an exterior surface of said rear door is parallel to the plane containing the left sidewall exterior surface.

2. A cargo vehicle enclosure as recited in claim 1, wherein:
the left rearward corner portion includes a vertically extending left rearward corner post component and a vertically extending left deflector component that cooperatively define the left air passageway; and
the right rearward corner portion includes a vertically extending right rearward corner post component and a vertically extending right deflector component that cooperatively define the right air passageway.

3. A cargo vehicle enclosure as recited in claim 1, wherein:
the left deflector component includes a left deflector component exterior surface;
the right deflector component includes a right deflector component exterior surface; and
the maximum distance between the left and right deflector component exterior surfaces is no more than about 108.375 inches.

4. A cargo vehicle enclosure as recited in claim 1, wherein:
the left rearward corner post component includes a left rearward corner post component interior surface;
the right rearward corner post component includes a right rearward corner post component interior surface; and
the left and right rearward corner post component interior surfaces are separated by no less than about 100.0 inches.

5. A cargo vehicle enclosure as recited in claim 1, further comprising left and right rear doors that are multi-panel folding doors adapted to be moved to open positions of the left and right rear doors such that when in the open positions the left and right rear doors extend forwardly past the left and right deflector components and alongside the left and right sidewalls.

6. A cargo vehicle enclosure as recited in claim 4, wherein:
the left rear door is a bi-folding door having a left jamb panel hinged to the left deflector component and a left main panel hinged to the left jamb panel; and
the right rear door is a bi-folding door having a right jamb panel hinged to the right deflector component and a right main panel hinged to the right jamb panel.

7. A cargo vehicle enclosure as recited in claim 1, wherein:
the left air passageway extends along a circularly shaped path, as viewed in a horizontal cross sectional plane through the left rearward corner portion, from a left inlet end that faces forwardly to a left outlet end that faces toward the region behind the rearward end portion of the enclosure; and
the right air passageway extends along a circularly shaped path, as viewed in a horizontal cross sectional plane through the left rearward corner portion, from a right inlet end that faces forwardly to a right outlet end that faces toward the region behind the rearward end portion of the enclosure.

8. A cargo vehicle enclosure as recited in claim 6, further comprising means for helping direct air toward the region behind the rearward end portion of the enclosure, said means including flexible left and right outlet flaps attached to the left and right rearward corner portions that extend rearwardly from the rearwardly facing left and right outlets.

9. A cargo vehicle enclosure as recited in claim 1, wherein:
the left sidewall has a left sidewall exterior surface, the right sidewall has a right sidewall exterior surface, and the maximum distance between the left and right sidewall exterior surfaces is no more than about 102.375 inches; and
the left rearward corner portion includes a left deflector component exterior surface, the right rearward corner portion includes a right deflector component exterior surface, and the maximum distance between the left and right deflector component exterior surfaces is no more than about 108.375 inches.

10. A cargo vehicle enclosure, comprising:
a rearward end portion; and
opposite left and right sidewalls extending to the rearward end portion in horizontally spaced-apart vertically extending positions;
wherein the left sidewall includes a left rearward corner portion;
wherein the right sidewall includes a right rearward corner portion; and
wherein the left and right rearward corner portions define left and right air passageways that direct air flowing rearwardly alongside the left and right sidewalls toward a region behind the rearward end portion of the enclosure;
wherein at least the left rearward corner portion includes a vertically extending left rearward corner post component and a vertically extending left deflector component that cooperatively define the left air passageway;
wherein at least the left air passageway extends along a circularly shaped path, as viewed in a horizontal cross sectional plane through the left rearward corner portion, from a left inlet end that faces forwardly to a left outlet end that faces toward the region behind the rearward end portion of the enclosure;
wherein the left corner post component has a generally planar inwardly directed surface, an outwardly directed surface, and a nonuniform thickness between the inwardly and outwardly directed surfaces as viewed in a horizontal cross sectional plane through the left rearward corner portion;
said nonuniform thickness including at least one thickness at which the outwardly directed surface extends to a plane containing the left sidewall; and
said nonuniform thickness including at least one other thickness at which the outwardly directed surface lies laterally inward of a plane containing the left sidewall;
whereby at least a portion of the left air passageway that is located forwardly of the rearward end portion of the enclosure extends inwardly of the plane containing the left sidewall;
said cargo vehicle enclosure further comprising at least one rear door that is mounted on one of the left and right rearward corner portions with a plurality of offset hinges that enable said rear door to be moved to a fully open position of said rear door in which a plane containing an exterior surface of said rear door is parallel to the plane containing the left sidewall.

* * * * *